March 26, 1935. F. M. ARCHIBALD ET AL 1,995,597
REMOVAL OF OBJECTIONABLE ORGANIC SULPHUR FROM
ISOPROPYL AND HIGHER SECONDARY ALCOHOLS
Filed July 29, 1932

Francis M. Archibald  Inventors
Clayton M. Beamer
By Attorney
W. E. Currie

Patented Mar. 26, 1935

1,995,597

UNITED STATES PATENT OFFICE 1,995,597

REMOVAL OF OBJECTIONABLE ORGANIC SULPHUR FROM ISOPROPYL AND HIGHER SECONDARY ALCOHOLS

Francis M. Archibald and Clayton M. Beamer, Elizabeth, N. J., assignors to Standard Alcohol Company Application July 29, 1932, Serial No. 625,786

4 Claims. (Cl. 202—57)

This invention relates to a method of removing objectionable sulphur compounds from isopropyl and higher secondary alcohols. More particularly it relates to the removal of mercaptans, hydrogen sulphide, and other sulphur compounds.

Secondary alcohols are manufactured by esterifying the lower boiling point petroleum oils with sulphuric acid, separating the acid liquor from the petroleum oils, hydrolyzing the separated acid liquor and recovering the resulting alcohols by steam distillation. These alcohols are characterized by pronounced color and disagreeable odor due to sulphur compounds present.

An object of this invention is to remove the sulphur compounds that impart a pronounced color and disagreeable odor to the alcohols.

The invention will be fully understood from the following description taken in connection with the accompanying drawing in which the figure is a diagrammatic view showing the preferred form of the invention:

Referring to the drawing, numeral 1 indicates a mixing tank. Mixed secondary alcohols containing objectionable sulphur compounds, for example, about .300% of sulphur, are passed from storage not shown through pipe 2 into tank 1. Recycled distillate containing objectionable sulphur compounds, for example about .318% sulphur, is passed into tank 1 by means of pipe 2a. The sodium plumbite solution, prepared by adding about 60 parts of litharge to about 125 parts of sodium hydroxide dissolved in 1000 parts of water, is passed from hopper 2b through pipe 2c arranged with valve 2d into mixing tank 1. The mixture in tank 1 is contacted by continuously withdrawing a portion of the mixture through pipe 5 by means of pump 6 and returning it through pipe 7 and spray pipe 8. The mixture in tank 1 may also be contacted by agitating with air by passing air into tank 1 by means of pipe 3, arranged with valve 4. An air vent pipe 7a arranged with pressure relief valve 7b is used to regulate the pressure in tank 1. Both or either one of the mixing means may be used at the same time, though it is preferred to mix by recirculation, as when mixed by blowing with air, some of the lighter alcohol vapors are lost.

A separatory tank 9 is connected with tank 1 by means of pipes 10, 12 and 14 arranged with valves 11, 13 and 15. After the sodium plumbite and alcohols have been continuously contacted for about two hours in tank 1, they are allowed to flow by gravity into separatory tank 9. Upon opening the valves 11, 13 and 15, more alcohol and sodium plumbite solution are continuously added to tank 1. The quantity of alcohol continuously added is governed by the amount passed from the separatory tank 9 to the distillation column 21. Only a small amount of sodium plumbite is added, as the first charge of sodium plumbite is active over an extended period of time before it is spent. Pump 10a is provided on pipe 10 to regulate the flow of sodium plumbite solution from tank 1 to separatory tank 9 especially when the sodium plumbite is spent and it is desirable to remove it from the system and add a fresh charge.

Tank 9 is provided at the bottom with a valved outlet 9a to remove the spent sodium plumbite. A baffle 16 is provided in tank 9 above which baffle an outlet pipe 17 is used to withdraw the treated alcohol. The treated alcohol is passed by means of pump 18 and pipe 19 arranged with valve 20, to an intermediate point of rectifying column 21. The rectifying column 21 is provided with a closed steam coil 22 at the bottom to vaporize the alcohols and the usual bell cap plates or other vapor-liquid contacting means. The alcohols on being heated are vaporized and a fraction of the alcohols together with the lighter boiling mercaptides are passed through pipe 23 to condenser 24 where they are condensed and passed through pipe 25 to weir 26. The condensate passing through weir 26 is divided into two parts, one portion being returned as reflux to column 21 by means of pipe 27 and valve 28, another portion being passed through pipe 31 arranged with valve 30 and then into a second weir 32. The quantity of reflux returned to column 21 is regulated by means of valves 28 and 30 and overflow pipe 29 arranged in weir 26 and is generally about 8 parts to 1 part or greater. The remaining portion of the condensate is passed from weir 32 through pipe 33 into decanter 34. Decanter 34 is arranged with a baffle 36 at the inlet from pipe 33 and a U-tube bottom outlet 35 arranged with a valve 35a which is used to remove the water that may separate in the lower part. Pipe 37 is used to withdraw the alcohol heads from the upper portion of decanter 34 and this alcohol may be passed through pipe 2a into tank 1 or to storage not shown. The withdrawal of this alcohol is regulated by means of valves 38 and 39 and the sulphur content of the condensate is generally higher than that of the initial alcohol used in the process.

The condensed portions of the alcohol present in column 21 on the second, third and fourth plates from the top are of low sulphur content and may be removed by means of pipes 40, 41 and 42 arranged with valves 43, 44 and 45 to cooler 46 and are generally about 4 parts to 1 part of alcohol removed by pipe 31. The cooled alcohol is withdrawn from cooler 46 through pipe 47 arranged with valve 48 to weir box 49 and through pipe 50 to storage not shown. The plates from which the condensate is withdrawn are regulated by means of valves 43, 44 and 45 and the sulphur content of the finished product is found to be materially reduced, for example, to .152% sulphur. The bottoms present in column 21 contain the high boiling mercaptides and are generally high in sulphur, for example, .64% sulphur, and they are withdrawn by means of pipe 51 furnished with valves 52 and 53. In operating this column about 15% low boiling alcohols and mercaptides are removed as overhead condensates, about 25% removed as higher boiling alcohols and mercaptides from the bottom of the column and about 60% removed by the side streams as purified alcohols.

The mixed alcohols used for the illustration were of a wide boiling range. If another mixture of alcohols of a narrower boiling range was taken, the percentages recovered as overhead and bottoms would be a great deal less and more purified alcohols would be recovered through the side streams.

If desired, a second column may be provided into which the purified alcohol recovered through streams 40, 41 and 42 may be passed and the alcohol further rectified under similar conditions as in column 21 to further reduce the sulphur content. This process may be operated either as intermittent or continuous. If desired to operate continuously, a number of mixing tanks similar to tank 1 may be provided and while the alcohol and sodium plumbite are being mixed in one tank, another mixture of the two solutions may be separated in a tank similar to separatory tank 9.

In the example disclosed, alcohols of definite sulphur content were shown but this is not intended as a limitation as they were given only for illustration.

The foregoing description is merely illustrative and alternative arrangement may be made within the scope of the appended claims in which it is our intention to claim all novelty as broadly as the prior art permits.

We claim:

1. The method of purifying secondary alcohols containing sulphur compounds, which comprises contacting secondary alcohols containing sulphur compounds with a water solution of sodium plumbite, separating the secondary alcohols from the sodium plumbite solution, subjecting the separated secondary alcohols to rectification and separately withdrawing liquid fractions of the purified secondary alcohols and vapor fractions of the secondary alcohols containing sulphur compounds.

2. The method of purifying secondary alcohols containing sulphur compounds, which comprises contacting secondary alcohols containing sulphur compounds with sodium plumbite solution for about two hours, settling the mixture of secondary alcohols and sodium plumbite into layers, separately withdrawing the secondary alcohol layer and the sodium plumbite solution, subjecting the separated secondary alcohols to rectification and separately withdrawing liquid fractions of the purified secondary alcohols and vapor fractions of the secondary alcohols containing sulphur compounds.

3. The method of purifying secondary alcohols containing sulphur compounds in solution, which comprises contacting secondary alcohols with a water solution of sodium plumbite, separating the secondary alcohols from the solution of sodium plumbite, passing the separated secondary alcohols to a rectification zone, separately withdrawing fractions of the secondary alcohol vapors containing the lower boiling point sulphur compounds, condensing the said vapors, returning a fraction of the condensate to upper part of the rectifying zone and withdrawing separate fractions of the purified secondary alcohols and of the secondary alcohols containing the higher boiling sulphur compounds.

4. The method of purifying secondary alcohols containing sulphur compounds in solution according to claim 3 in which a part of the condensate is contacted with a water solution of sodium plumbite, separated from water solution of sodium plumbite and rectified.

FRANCIS M. ARCHIBALD.
CLAYTON M. BEAMER.